US012162028B2

(12) United States Patent
Zvara

(10) Patent No.: US 12,162,028 B2
(45) Date of Patent: Dec. 10, 2024

(54) AIR ASSIST SPRAY ASSEMBLY

(71) Applicant: PRECISION DRONE SERVICES INTELLECTUAL PROPERTY, LLC, Medina, OH (US)

(72) Inventor: Stephen Zvara, Cleveland, OH (US)

(73) Assignee: PRECISION DRONE SERVICES INTELLECTUAL PROPERTY, LLC, Medina, OH (US)

(*) Notice: Subject to any disclaimer, the term of this patent is extended or adjusted under 35 U.S.C. 154(b) by 275 days.

(21) Appl. No.: 17/201,615

(22) Filed: Mar. 15, 2021

(65) Prior Publication Data
US 2021/0283639 A1  Sep. 16, 2021

Related U.S. Application Data

(60) Provisional application No. 62/988,992, filed on Mar. 13, 2020.

(51) Int. Cl.
*B05B 12/18* (2018.01)
*B05B 1/20* (2006.01)
(Continued)

(52) U.S. Cl.
CPC .............. *B05B 12/18* (2018.02); *B05B 1/20* (2013.01); *B05B 13/005* (2013.01); *B64D 1/18* (2013.01);
(Continued)

(58) Field of Classification Search
CPC ......... B05B 12/18; B05B 1/20; B05B 13/005; B64C 39/024; B64U 10/13; B64U 2101/00; B64D 1/16; B64D 1/18
(Continued)

(56) References Cited

U.S. PATENT DOCUMENTS 1,142,074 A    6/1915   Woodward
4,553,702 A *  11/1985  Coffee ................ B05B 7/2486
                                                    239/159
(Continued)

FOREIGN PATENT DOCUMENTS

CN    204110368    1/2015
CN    204527648    8/2015
(Continued)

OTHER PUBLICATIONS

Patent Cooperation Treaty (PCT), International Search Report and Written Opinion for Application PCT/US2021/022339 filed Mar. 15, 2021, dated May 21, 2021, International Searching Authority, EP.

(Continued)

*Primary Examiner* — Steven J Ganey
(74) *Attorney, Agent, or Firm* — McDonald Hopkins LLC

(57) ABSTRACT

An air assist spray assembly for an aerial vehicle as shown and described. The air assist spray assembly may include a boom structure having a plurality of spray nozzles configured to dispense fine and course spray droplet sizes. The spray nozzle may be an electrostatic type of nozzle. The boom structure may include an air curtain system that includes an elongated air passageway with a plurality of air nozzles. The air curtain system may include a front air curtain and/or a rear air curtain to assist with directing the spray of electrostatically charged fine and coarse droplets from the spray nozzles towards vegetation.

19 Claims, 19 Drawing Sheets

(51) Int. Cl.
    *B05B 13/00*      (2006.01)
    *B64D 1/18*       (2006.01)
    *B64U 101/40*     (2023.01)
    *B64U 101/45*     (2023.01)

(52) U.S. Cl.
    CPC ...... *B64U 2101/40* (2023.01); *B64U 2101/45* (2023.01)

(58) Field of Classification Search
    USPC .................. 239/77, 171, 295, 690, 159–167
    See application file for complete search history.

(56) References Cited

U.S. PATENT DOCUMENTS

| | | | |
|---|---|---|---|
| 4,982,898 | A | 1/1991 | Ballu |
| 5,971,295 | A | 10/1999 | Jensen et al. |
| 6,457,761 | B1 | 10/2002 | Benoit |
| 8,087,315 | B2 | 1/2012 | Goosen et al. |
| 8,162,263 | B2 | 4/2012 | Wong et al. |
| 8,251,307 | B2 | 8/2012 | Goossen |
| 8,752,796 | B2 | 6/2014 | Occhiato et al. |
| 9,280,038 | B1 | 3/2016 | Pan et al. |
| 9,346,547 | B2 | 5/2016 | Patrick et al. |
| 9,382,003 | B2 | 7/2016 | Burema et al. |
| 9,487,292 | B2 | 11/2016 | Prud'Homme-Lacroix |
| 9,493,232 | B2 | 11/2016 | Wang et al. |
| 9,567,081 | B1 | 2/2017 | Beckman et al. |
| 9,573,684 | B2 | 2/2017 | Kimchi et al. |
| 9,630,715 | B2 | 4/2017 | Takayama |
| 9,688,404 | B1 | 6/2017 | Buchmueller et al. |
| 9,714,012 | B1 | 7/2017 | Hoareau et al. |
| 10,399,676 | B2 | 9/2019 | Dahlstrom |
| 11,014,668 | B2 | 5/2021 | Wu et al. |
| 11,065,636 | B2 | 7/2021 | Fideler et al. |
| 11,130,573 | B2 | 9/2021 | Holly et al. |
| 2004/0016820 | A1 | 1/2004 | Jones |
| 2012/0153087 | A1 | 6/2012 | Collette et al. |
| 2016/0023761 | A1 | 1/2016 | McNally |
| 2016/0198088 | A1 | 7/2016 | Wang et al. |
| 2016/0207627 | A1 | 7/2016 | Hoareau et al. |
| 2017/0081043 | A1 | 3/2017 | Jones et al. |
| 2017/0144759 | A1 | 5/2017 | Chiu |
| 2017/0203857 | A1 | 7/2017 | O'Toole |
| 2017/0253335 | A1 | 9/2017 | Thompson et al. |
| 2017/0267348 | A1 | 9/2017 | Sweeny et al. |
| 2018/0319499 | A1 | 11/2018 | Holly et al. |
| 2020/0329690 | A1* | 10/2020 | Chapple ................ A01M 7/005 |
| 2022/0023904 | A1* | 1/2022 | Chapple ................ B05B 13/005 |

FOREIGN PATENT DOCUMENTS

| | | |
|---|---|---|
| CN | 204713430 | 10/2015 |
| CN | 105035336 | 11/2015 |
| CN | 204776056 | 11/2015 |
| CN | 204871622 | 12/2015 |
| CN | 204871626 | 12/2015 |
| CN | 204895855 | 12/2015 |
| CN | 105438491 | 3/2016 |
| CN | 105697957 | 6/2016 |
| CN | 106081113 | 11/2016 |
| CN | 106114879 | 11/2016 |
| CN | 205872497 | 1/2017 |
| CN | 205891249 | 1/2017 |
| CN | 106428598 | 2/2017 |
| CN | 205931259 | 2/2017 |
| CN | 205971822 | 2/2017 |
| CN | 206012972 | 3/2017 |
| CN | 106585990 | 4/2017 |
| CN | 206107589 | 4/2017 |
| CN | 106628217 | 5/2017 |
| CN | 106672240 | 5/2017 |
| CN | 106794902 | 5/2017 |
| CN | 206196773 | 5/2017 |
| CN | 106864752 | 6/2017 |
| CN | 106892117 | 6/2017 |
| CN | 106986031 | 7/2017 |
| CN | 206299660 | 7/2017 |
| CN | 107108042 | 8/2017 |
| CN | 206476116 | 9/2017 |
| CN | 110217397 | 9/2019 |
| DE | 102010010508 | 9/2011 |
| FR | 3040688 | 3/2017 |
| IN | 201741025926 | 7/2017 |
| KR | 101780454 | 9/2017 |
| WO | 2015177760 | 11/2015 |
| WO | 20160185572 | 11/2016 |
| WO | 20160190994 | 12/2016 |
| WO | 201700299 | 1/2017 |
| WO | 201708533 | 1/2017 |
| WO | 20170019728 | 2/2017 |
| WO | 20170069524 | 4/2017 |
| WO | 201796392 | 6/2017 |
| WO | 20170099058 | 6/2017 |

OTHER PUBLICATIONS

International Search Report for PCT/US2018/049063 dated Jan. 1, 2019, 5 pages.

* cited by examiner

Line A-A

AIR ASSIST SPRAY ASSEMBLY

CROSS-REFERENCE TO RELATED APPLICATIONS

This application claims priority to and the benefit of U.S. Provisional Patent App. No. 62/988,992, titled "AIR ASSIST SPRAY ASSEMBLY" filed Mar. 13, 2020 which is incorporated by reference in its entirety. This application is related to U.S. patent application Ser. No. 16/119,010 entitled "AERIAL VEHICLE IMPLEMENT HITCH ASSEMBLY" filed on Aug. 31, 2018 which is incorporated by reference in its entirety.

FIELD OF INVENTION

The present invention generally relates to an air assist spray assembly for an aerial vehicle, and more particularly to an unmanned aerial vehicle.

BACKGROUND

Crop dusting or aerial application has been used to distribute chemicals or seeds to large swaths of land. Additionally, aerial vehicles have been recently adapted for delivering goods and products, surveillance, and other services, especially for unmanned aerial vehicles (UAVs). Further, aerial vehicles such as UAVs may be used to perform various tasks having implements such as seed or chemical dispensing mechanisms attached thereto.

However, drawbacks exist regarding the operation of aerial vehicles adapted to spray or dispense chemicals therefrom in an agricultural setting. When spraying crops with chemical agents such as insecticides, fungicides, fertilizer, and the like, a problem resides in that the plants must be sprinkled on all surfaces as uniformly as possible, and for this reason, the chemical agent is usually atomized. This, however leads to the disadvantage that the wind may interfere whereby the chemical mist or spray is carried away by the wind and deposited in the wrong places. Additionally, many crops form a canopy barrier which includes an interwoven tangle of foliage that prevent the aerial dispensed chemical from sufficiently penetrating the canopy to be properly applied to the crops or vegetation as desired. As such, the underside of the canopy remains untreated with only portions along the tops thereof having the desired chemical application.

As a consequence, aerial applicators and agricultural stakeholders have been subject to inefficient application of chemicals and the market has a desire to promote the development of more efficient methods and implements for reducing the required dose rates by ensuring a correct deposition of the spraying agent.

Forced air streams have long been known as a method of constraining, transporting and depositing sprays for crop protection. For example, U.S. Pat. No. 4,982,898 discloses an agricultural sprayer having a rigid outer tube with a flexible, internal air duct. U.S. Pat. No. 5,971,295 discloses an agricultural sprayer with an air-flow generating assembly for a land vehicle that has been shown to provide controlled air outflow associated with spraying assemblies. However, these devices require assembly to a ground vehicle which may cause disruption to the soil due to forces related to wheels or a However, there remains a need for an improved air assisted spray assembly that is attachable to an aerial vehicle, such as an unmanned aerial vehicle or helicopter, to allow for it to fully and efficiently distribute a spraying agent in a an accurate application to a desired target area.

SUMMARY

An air assist spray assembly for an aerial vehicle as shown and described. The air assist spray assembly may include a boom structure having a plurality of spray nozzles configured to dispense fine and course spray droplet sizes. The spray nozzle may be an electrostatic type of nozzle. The boom structure may include an air curtain system that includes an elongated air passageway with a plurality of air nozzles. The air curtain system may include a front air curtain and/or a rear air curtain to assist with directing the spray of electrostatically charged fine and coarse droplets from the spray nozzles towards vegetation.

In one embodiment, provided is an air assist spray assembly for a rotorcraft type unmanned aerial vehicle comprising a boom structure including a base frame configured to be attached to a rotorcraft type unmanned aerial vehicle, the boom structure includes a first elongated member extending outwardly from the base frame and a second elongated member extending outwardly from the base frame. A plurality of spray nozzles positioned along the first elongated member and the second elongated member, the plurality of spray nozzles configured to dispense spray droplets therefrom. An air curtain system that includes an elongated air passageway positioned along at least one of the first elongated member and the second elongated member, the air curtain system configured to distribute pressurized air from the elongated air passageway wherein the air curtain system is configured to assist with directing the spray droplets from the plurality of spray nozzles towards a desired area while said rotorcraft type unmanned aerial vehicle is in flight. The assembly may further comprise a pressurized air generating component in communication with the elongated air passageway of the air curtain system, the pressurized air generating component positioned on the base frame of the boom structure; and a storage container in fluid communication with the plurality of spray nozzles positioned along the first elongated member and the second elongated member, the storage container positioned on the base frame of the boom structure. At least one of the spray nozzles may be a rotary atomizer type spray nozzles or at least one of the spray nozzles is an electrostatic type spray nozzle. The spray nozzles are configured to dispense both a fine spray droplet size and a course spray droplet size. The air curtain system includes a plurality of air nozzles aligned along a length of the air curtain system. The elongated fluid passage includes an air manifold assembly with a plurality of first air nozzles and a plurality of second air nozzles, wherein the plurality of first air nozzles are configured to dispense air to form a first air curtain along a first direction of the boom structure and the plurality of second air nozzles are configured to dispense air to form a second air curtain along a second direction of the boom structure, wherein the first air nozzles are positioned along a first side of a plurality of spray nozzles and the second air nozzles are positioned along a second side of the plurality of spray nozzles, wherein the first side is generally opposite from the second side. The air manifold assembly may be configured to toggle the air curtain system to at least one of (i) dispense air to only form the first air curtain, (ii) dispense air to only form the second air curtain, (iii) dispense air to form both the first air curtain and the second air curtain, (iv) not dispense air from either the first air curtain or the second air curtain. The elongated fluid passage and the air manifold assembly may be positioned along both the first elongated member and the second elongated member. The boom structure may be configured to be arranged in an extended operation position when configured to dispense fluid and a retracted storage position. The first elongated member may includes a plurality of sections each section includes a coupling member therebetween wherein the coupling member is configured to allow for both fluid communication and pressurized air communication between adjacent sections and allow the first elongated member to be rotated between the extended operation position and the retracted storage position. The second elongated member includes a plurality of sections each section includes a coupling member therebetween wherein the coupling member is configured to allow for both fluid communication and pressurized air communication between adjacent sections and allow for the second elongated member to be rotated between the extended operation position and the retracted storage position.

In another embodiment, provided is an air assist spray assembly for a rotorcraft type unmanned aerial vehicle comprising a boom structure including a base frame configured to be attached to a rotorcraft type unmanned aerial vehicle, the boom structure includes a first elongated member extending outwardly from the base frame and a second elongated member extending outwardly from the base frame; a plurality of spray nozzles positioned along the first elongated member and the second elongated member, the plurality of spray nozzles configured to dispense spray droplets therefrom; and an air curtain system configured to distribute pressurized air, wherein the air curtain system is configured to assist with directing the spray droplets from the plurality of spray nozzles towards a desired area while said rotorcraft type unmanned aerial vehicle is in flight wherein at least one of the plurality of nozzles is an electrostatic spray nozzle. The air curtain system may include an elongated air passageway positioned along at least one of the first elongated member and the second elongated member, the air curtain system configured to distribute pressurized air from the elongated air passageway. The assembly may further comprise a pressurized air generating component in communication with the elongated air passageway of the air curtain system, the pressurized air generating component positioned on the base frame of the boom structure; and a storage container in fluid communication with the plurality of spray nozzles positioned along the first elongated member and the second elongated member, the storage container positioned on the base frame of the boom structure. At least one of the spray nozzles may be a rotary atomizer type spray nozzle. The spray nozzles may be configured to dispense both a fine spray droplet size and a course spray droplet size. The air curtain system includes a plurality of air nozzles aligned along a length of the air curtain system. The air curtain system includes an air manifold assembly with a plurality of first air nozzles and a plurality of second air nozzles, wherein the plurality of first air nozzles are configured to dispense air to form a first air curtain along a first direction of the boom structure and the plurality of second air nozzles are configured to dispense air to form a second air curtain along a second direction of the boom structure, wherein the first air nozzles are positioned along a first side of a plurality of spray nozzles and the second air nozzles are positioned along a second side of the plurality of spray nozzles, wherein the first side is generally opposite from the second side. The air manifold assembly is configured to toggle the air curtain system to at least one of (i) dispense air to only form the first air curtain, (ii) dispense air to only form the second air curtain, (iii) dispense air to form both the first air curtain and the second air curtain, (iv) not dispense air from either the first air nozzles or the second air nozzles. The boom structure may be configured to be arranged in an extended operation position when configured to dispense fluid and a retracted storage position.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined, switched, or altered without departing from the scope of the present teachings, e.g., features of each embodiment disclosed herein may be combined, switched, or replaced with features of the other embodiments disclosed herein. As such, the following description is presented by way of illustration only and should not limit in any way the various alternatives and modifications that may be made to the illustrated embodiments and still be within the spirit and scope of the present teachings.

Figure 1:
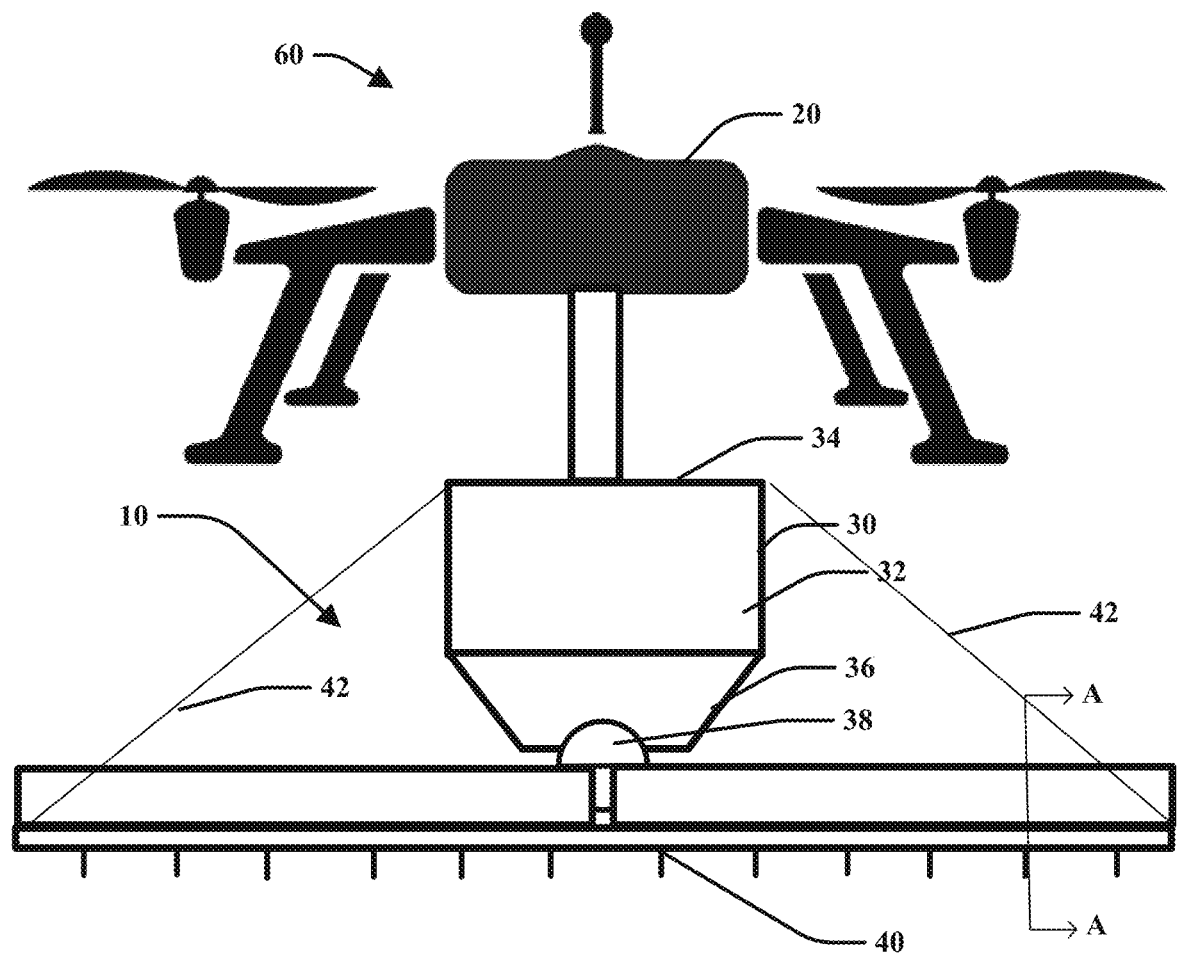
FIG. 1 is a schematic diagram of embodiments of an aerial vehicle with an air assist spray assembly in accordance with the instant disclosure.
Figure 2:
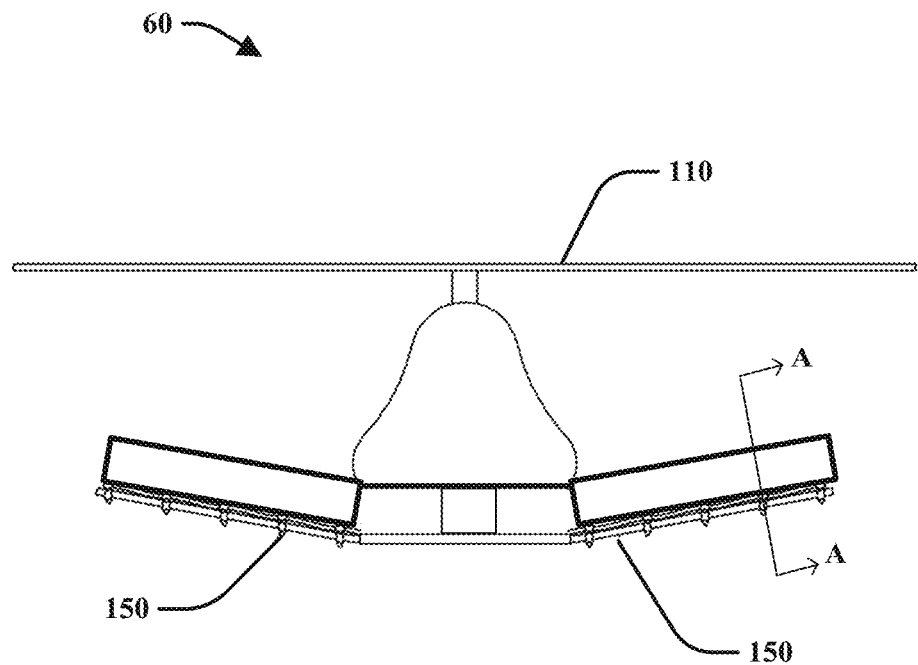
FIG. 2 is a schematic diagram of another embodiment of an aerial vehicle with an air assist spray assembly in accordance with the instant disclosure.

Disclosed herein is an air assist spray assembly 10 that is adapted to dispense a fluid product such as an insecticide, fungicide, fertilizer, or other such fluid or chemical that may be desired to be applied to a large agricultural space. In a preferred embodiment, the air assist spray assembly 10 is configured to be used and designed to be used with an aerial vehicle. The aerial vehicle may be an unmanned aerial vehicle (UAV) 20 as illustrated by FIG. 1, a airplane 22 as illustrated by FIG. 2 or other type of aircraft. However, this disclosure is not limited as the air assist spray assembly 10 may be used with various different types of aerial vehicles such as helicopters, hovercrafts, fixed wing airplanes, balloons, transitional flight vehicles, gyroplanes, or gyrocopters. It may even be used with land vehicles such as tractors, trucks, or other types of agriculture machinery and this disclosure is not limiting in this regard. For brevity, the air assist spray assembly 10 will be discussed as attaching to an aerial vehicle herein. However, it has been identified to be particularly useful when attached to aerial vehicles considered rotorcraft. The term "rotorcraft" as used herein means any aerial vehicles that rely on rotary wings or rotor blades to generate lift by rotating around a vertically oriented mast. Rotorcraft can include vertical take off and landing aircraft such as unmanned aerial vehicles (drones), helicopters, gyrocopters, gyroplanes, rotaplanes, gyrodynes, rotor kites, or even transitional flight vehicles such as the US Air Force's Osprey aircraft.

In one embodiment, the air assist spray assembly 10 is configured to extend from an aerial vehicle 20, 22. It may be securely attached by a mount assembly 30 to the aerial vehicle to allow for structural stability during flight. In one embodiment, secured attachment and detachment may be performed using a hitch mount assembly as disclosed by U.S. Published Patent No. 2019/0061944 which is incorporated by reference in its entirety. Such a hitch mount assembly 30 may include a gimbal system that may include associated control and sensing systems to allow for the air assist spray assembly 10 to be maintained at a generally level orientation relative to the desired region to receive the spray application.

The air assist spray assembly 10 may include a boom structure 40 that extends from the mount assembly 30 and includes a discharge channel intended for the discharge of a desired substance in liquid or in solid form. In one embodiment, the boom structure 40 includes two sections that extend across the field with each section extending laterally from each side of a mount assembly 30. The mount assembly may allow for pivoting of the boom structure 40 between a working position and a transport position. The boom structure 40 may include a plurality of support sections and may include wire supports 42 and/or frame support members. In an embodiment, the boom structure may extend about 25 feet in length having any length is generally contemplated herein.

The mount assembly 30 may be configured to support a hopper or storage container 32 may define a cavity 34 capable of containing a liquid product. The container 32 may be selectively attached to the boom structure 40 to provide the liquid product thereto for distribution therefrom. A pressurization device 36 may be attached to the mount assembly 30 and in communication with the boom structure to provide pressurized air thereto for distribution therefrom. The pressurization device 36 may be configured receive inlet air during operation and increase the pressure of the air to be provided along the boom structure 40. A discharge valve 38 may be provided at or near the coupling of the container 32 and or the pressurization device 36 and the air assist spreader assembly 10. When closed, the discharge valve may hold any product within the container from entering into the spreader.

Figure 3:
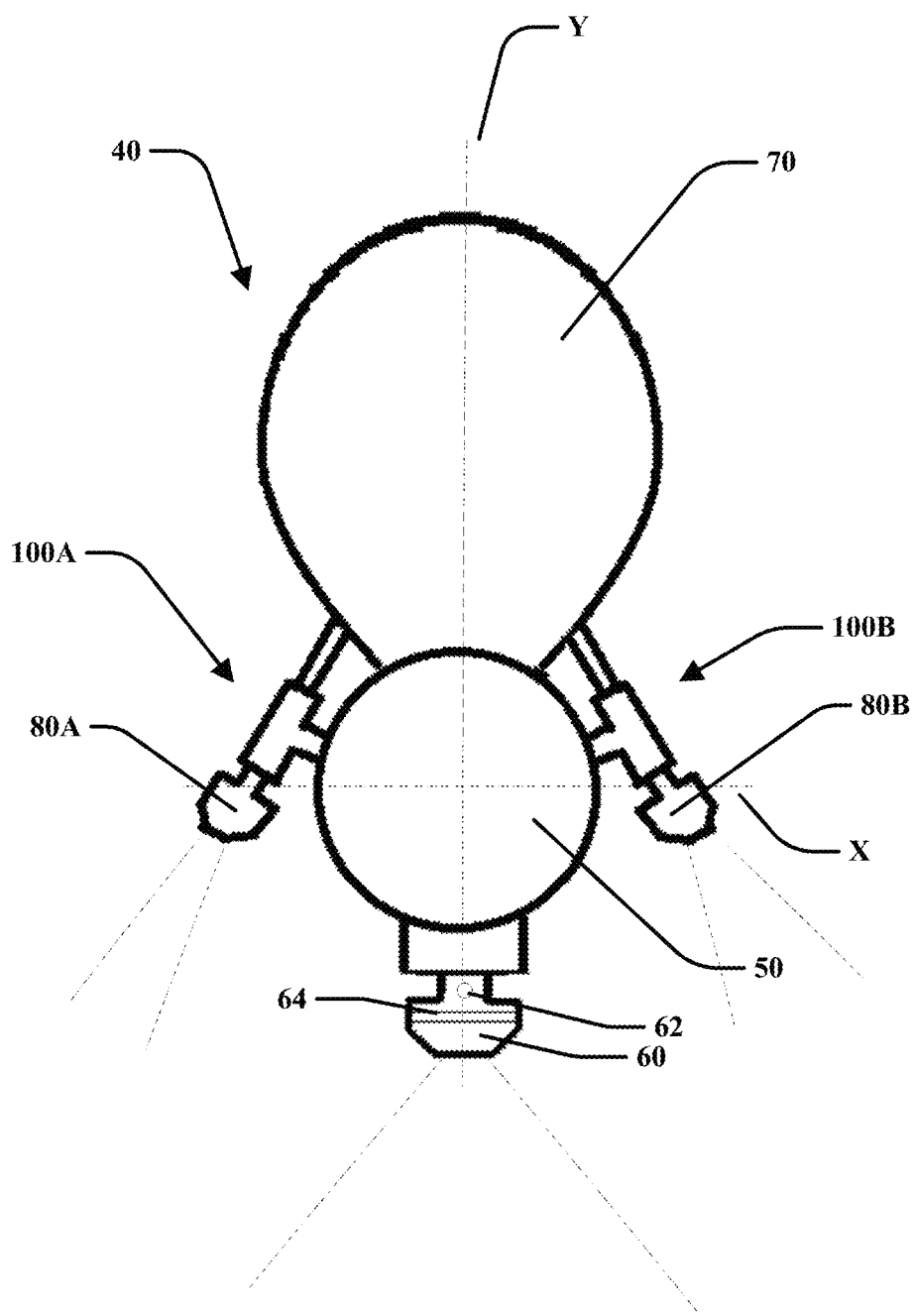
FIG. 3 is a cross sectional diagram of the air assist spray assembly through line A-A of FIGS. 1 and 2 in accordance with the instant disclosure.

FIG. 3 illustrates a cross sectional view of the boom structure 40 along line A-A of both FIGS. 1 and 2 along vertical axis X and horizontal axis Y. The boom structure 40 may include a discharge channel 50, a plurality of spray nozzles 60, and an elongated air passageway 70. The discharge channel 50 may be in fluid communication with the container 32 to allow liquid product to be provided to the plurality of spray nozzles 60 aligned along the discharge channel 50. The discharge channel 50 may be a generally elongated conduit having a perimeter. The perimeter shape of the discharge channel may be generally cylindrical, or may have an airfoil shape (not shown) to assist with aerodynamic motion of the boom structure 40 when in use. The plurality of spray nozzles 60 may be configured to distribute fluid product from the discharge channel 50. The spray nozzles 60 may be pivotally attached to the discharge channel 50 to allow for adjustment of the angle of the nozzle. In an embodiment, the spray nozzle 60 may be configured to process fluid therethrough in a way that would produce a spray of fluid droplets to be applied to vegetation below. The spray of fluid droplets may include various size droplets including fine droplets and coarse droplets to allow for the fluid product to apply and penetrate a vegetation canopy. The spray nozzle may be configured to be adjusted to spray only fine droplets or only coarse droplets or a mixture of both types of fine and coarse droplets as desired. Notably, the heavier or larger the droplet size of the fluid spray the more inertia and penetration of fluid product would occur through the vegetation canopy.

In an embodiment, the spray nozzle may include an air inlet 62 along its perimeter to allow ambient air to enter a nozzle head and be mixed with the fluid prior to be distributed through a nozzle exit. This air inlet 62 may allow for adjustments and may allow a user to modify the fine/coarse spray sizes of fluid distributed therefrom.

In another embodiment, the plurality of spray nozzles 60 may be an electrostatic spray nozzle. Here, the spray nozzle may include a conductor configured to produce a voltage charge to the flow of fluid through the nozzle head. The conductor may be configured to apply a positive or a negative charge to the fluid prior to it being emitted from the nozzle. Spray droplets emitted through the electrostatic spray nozzle may be charged and when such charged droplets approach the vegetation, an opposite charge on the vegetation activates electrostatic forces and attracts the charged droplets to all sides of the vegetation.

Further, the boom structure 40 may also include an air curtain system to assist with diverting the dispensed fluid from the plurality of spray nozzles 60. The air curtain system may assist with directing sprayed fluid that may include fine or coarse charged droplets towards intended vegetation. The combination of an air curtain system along with an electrostatic charge to both fine and coarse sized droplets may cause improved canopy penetration and improve the efficiency of aerial application of fluid chemicals over an increased portion of the vegetation to increase application yield. This assembly and system to increase canopy penetration as well as reduce waist will reduce waste and volume of chemicals needed in the agriculture market.

The air curtain system may include a rear air curtain 100A. The air curtain system may include a front air curtain 100B. Further, the air curtain system may include both front and rear air curtains 100A, 100B. Each of the front and rear air curtains 100A, 100B may include a plurality of air nozzles 80A, 80B. The air nozzles may be configured to receive pressurized air from the elongated air passageway 70. The plurality of air nozzles 80B along the front air curtain 100B may be positioned adjacent the spray nozzles 60 but be positioned along a forward direction of the boom 40. The plurality of air nozzles 80A along the rear air curtain 100A may be positioned adjacent the spray nozzles 60 but be positioned along a rearward direction of the boom 40. The elongated air passageway 70 may be made of any material including hose, tube, nylon, polymers and may be generally rigid or generally flexible. Further, at least one valve may be positioned along the elongated air passageway 70, preferably towards the ends away from the mounting assembly 30 to assist with regulating pressure therein.

Figure 4:
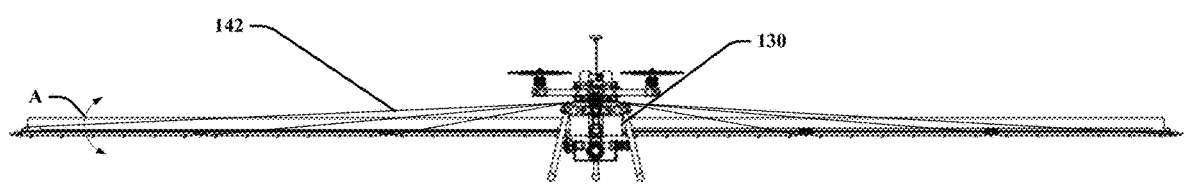
FIG. 4 is a plan view of an embodiment of the air assist spray assembly attached to a rotorcraft according to the instant disclosure.

FIGS. 4 through 16 illustrate another embodiment of the air assist spray assembly 110 disclosed herein. FIG. 4 illustrates a front view of the assembly attached to a rotorcraft 120. In this instance, the rotorcraft 120 is a vertical take off and landing unmanned aerial vehicle. The air assist spray assembly 110 is configured to extend from the rotorcraft 120 as defined herein or even an airplane 22. The air assist spray assembly 110 may include a base frame 130 for secure attachment to the rotorcraft 120. In an embodiment, the base frame 130 may be securely attached by a mount assembly as discussed above to allow for structural stability during flight. In one embodiment, secured attachment and detachment may be performed using a hitch mount assembly as disclosed by U.S. Published Patent No. 2019/0061944 which is incorporated by reference in its entirety. Such a hitch mount assembly may include a gimbal system that may includes associated control and sensing systems to allow for the air assist spray assembly 110 and its boom structure to be maintained at a generally level orientation relative to the desired area intended to receive the spray application. It may also allow for controlled adjustment of the angle of the boom structure 140 relative to the rotorcraft 120 to allow the assembly 100 to traverse uneven terrain. In an embodiment, the base frame 130 and mount assembly may allow the boom structure 140 to adjust up to about 30 degrees relative to the horizon along the direction as annotated by arrows A of FIG. 4 while the rotorcraft 120 may maintain its level flight pattern.

In an embodiment, the boom structure 140 may be supported by one or more wires 142 to allow the boom structure to extend outwardly from the rotorcraft 120. The wires 142 may be attached to one ore more portions of the boom structure 140 and one or more portions of the base frame 130. The boom structure may include a first elongated member 144 and a second elongated member 146 wherein each member may be extend from a base frame 130. Notably, this disclosure may incorporate any number and any size of elongated members as may be practical for the desired application.

Figure 5:
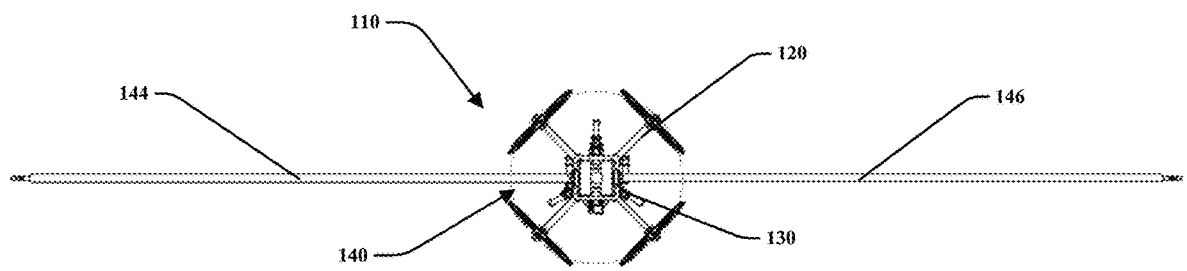
FIG. 5 is a top view of the air assist spray assembly attached to a rotorcraft according to FIG. 4.

Notably, the base frame 130 may be attached to the mount assembly which is attachable to the rotorcraft 120. The first elongated member 144 may extend and be aligned along a common axis with the second elongated member 146 that extends opposite from the rotorcraft 120 when in an extended operable position as illustrated by FIGS. 4 and 5. The first elongated member 144 and second elongated member 146 may also be configured to be arranged in a retracted position for storage or transport such as disclosed by FIGS. 6-9B.

The base frame 130 may be configured to support a hopper or storage container 132 that may define a cavity capable of containing a liquid product. The container 132 may be selectively attached to the base frame 130 or boom structure 140 to provide the liquid product thereto for distribution therefrom. The storage container 132 may also include a fluid pressurization device 134 such as a pump and related fittings and hoses to distribute fluid from the container 132 to the spray nozzles positioned along an elongated discharge channels of the first and second elongated members 144, 146. The fluid pressurization device 134 may be attached to the container 132 or positioned in a housing adjacent to the container 132 that is located on the base frame 130. An air pressurization device 136 may be attached to the base frame 130 and be configured in communication with the boom structure to provide pressurized air thereto for distribution therefrom. The pressurization device 136 may be a motorized fan that is configured receive inlet air during operation and increase the pressure of the air to be provided along the boom structure 140 and in particular along an elongated air curtain system 200 and associated air passageway 170 as will be discussed more fully below. A discharge valve 138 may be provided at or near the coupling of the container 132 and or the fluid pressurization device 134. The discharge valve 138 may be manually or automatically operated to toggle it between an opened and closed position. When closed, the discharge valve may prevent any fluid within the container from entering into the elongated members 144, 146

In one embodiment, the first elongated member 144 and second elongated member 146 may each have a common length and configuration. However, the first and second elongated members may also have different configurations, lengths, configurations of spray and air nozzles, etc. which are contemplated herein. Each may include a plurality of sections 148 that are coupled to one another that will allow for each section to be supported in an elongated aligned configuration when in the operable positon (i.e., FIGS. 4 and 5) or be swiveled, bent, or rotated relative to one another and relative to the base frame 130 along a coupling section 150 to allow the plurality of sections 148 to be placed in a variety of retracted positions that allows for the storage or transport of the assembly 110 (i.e., FIGS. 6-9B).

Figure 6:
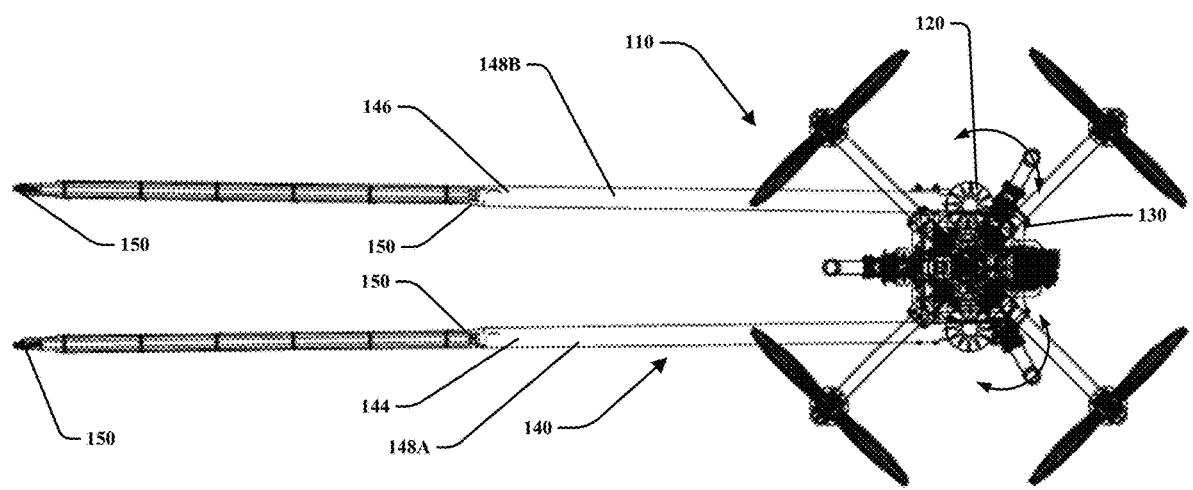
FIG. 6 is a top view of an embodiment of the air assist spray assembly of the instant disclosure in a retracted position.

FIG. 6 illustrates a top view of the assembly 110 having sections 148A of the first elongated member 144 positioned in general parallel alignment with sections 148B of the second elongated member 146. Here, the first and second elongated members 144, 146 are moveably attached to the base frame and are capable of rotating relative to the base frame 130 to be positioned in generally parallel alignment. The boom structure 140 may include fasteners that lock the first and second elongated members 144, 146 in place in the operable position (i.e., FIGS. 5 and 5) while the first and second elongated members may be retracted by disengagement of fasteners or other hinge members to be placed in the retracted position. This application contemplates that any type of fastener, hinge or other device may be applied to configure the boom structure 140 between the operable extended position and the various retracted positions. Further, the plurality of sections 148 may be swiveled, bent or rotated along coupling sections 150 to further brake down the assembly 120 into the various retracted positions.

Figure 7:
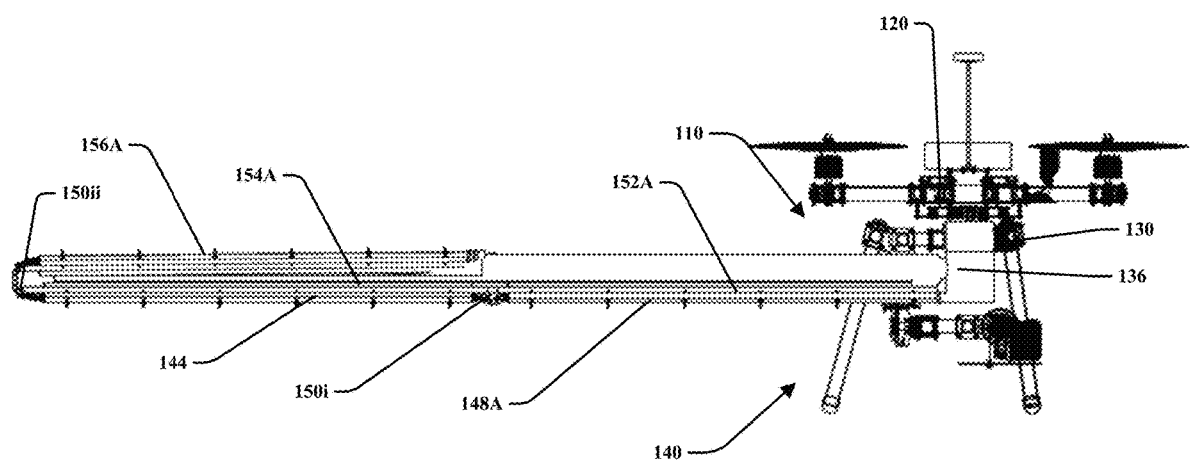
FIG. 7 is a side view of the air assist spray assembly of FIG. 6 in a retracted position.
Figure 8:
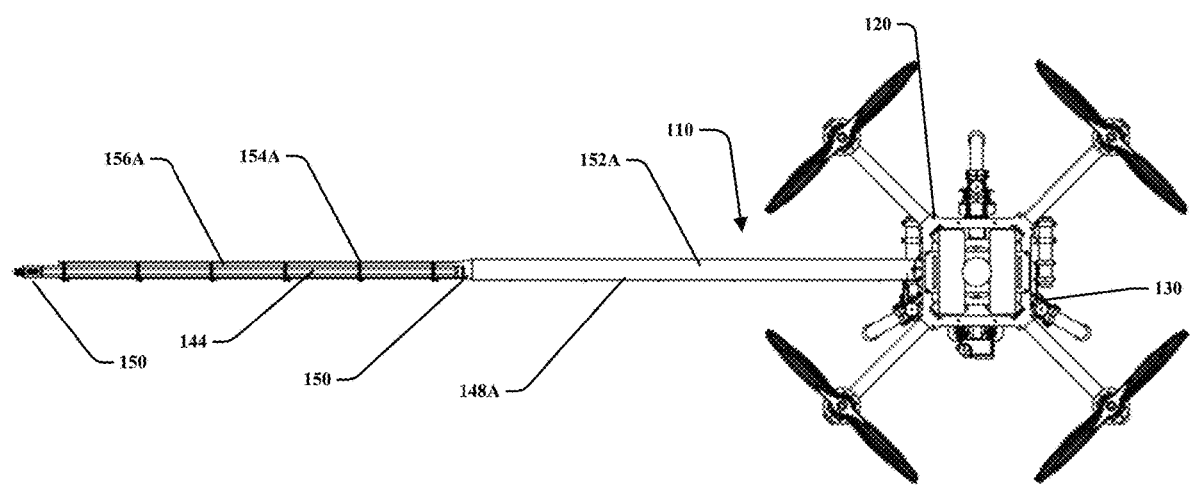
FIG. 8 is a top view of the air assist spray assembly of the instant disclosure in a retracted position.

As illustrated by FIGS. 7 and 8, the first elongated member 144 and three sections 148A are illustrated in a retracted positon. The three sections 148A include a fuselage section 152A positioned adjacent to the base frame 130, an inboard section 154A coupled to the fuselage section 152A by coupling section 150*i*, and an outboard section 156A coupled to the inboard section 154A by a second coupling section 150*ii*. In one embodiment of a retracted position, the outboard section 156A is illustrated as being swiveled about 180 degrees relative to the inboard section 154A such that the outboard section 156A is positioned to abut along the inboard section 154A. Here, the air passageway 170 may be compressed or flattened between the outboard section 156A and the inboard section 154A. Notably, the retracted outboard section 156A and inboard section 154A may also be swiveled along the coupling section 150*i* between the inboard and fuselage sections to further retract the first elongated member 144 from the extended position to a retracted storage position. Notably, both the first and second elongated members 144, 146 are configured to be extended or retracted as disclosed herein.

Figure 9A:
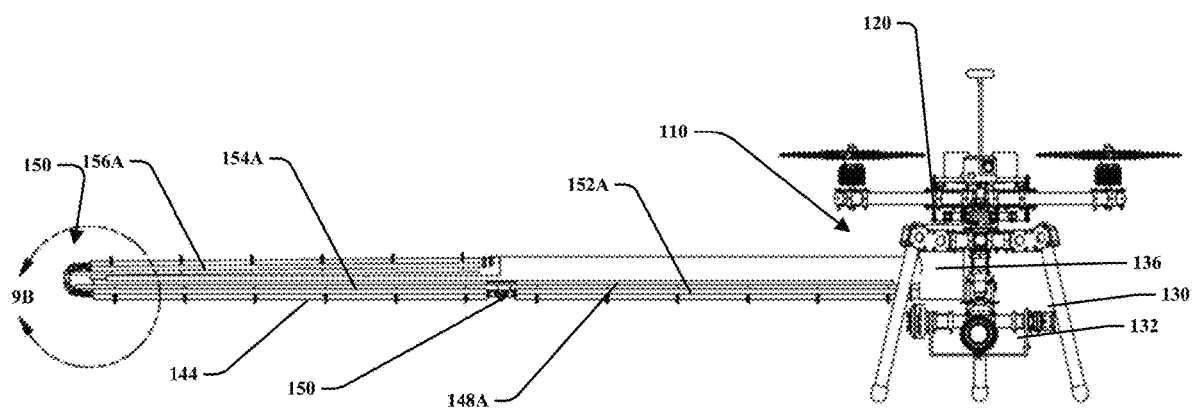
FIG. 9A is a side view of an embodiment of the air assist spray assembly of the instant disclosure in a retracted position.
Figure 9B:
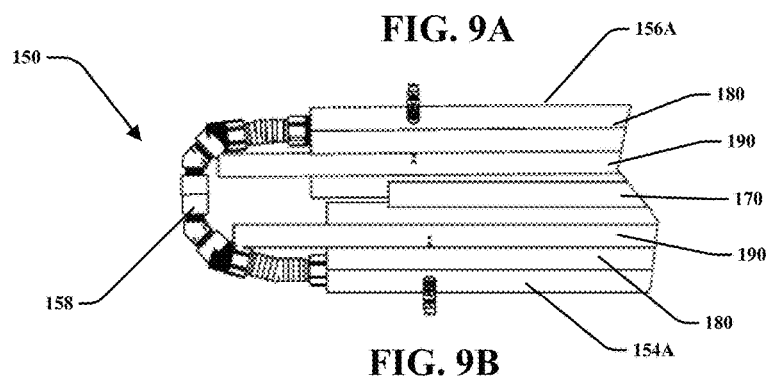
FIG. 9B is an enlarged view of a coupling member of the air assist spray assembly of FIG. 9A.

FIGS. 9A and 9B illustrate the coupling member 150 that includes a flexible hose assembly 158 that allows for the swiveling, bending, or rotating action between the sections 148A, 148B of the first and second elongated members 144, 146. Notably, in an embodiment, the sections 148A, 148B along the first and second elongated members 144, 146, respectively may each include an air passageway portion 170, a discharge channel portion 180, and an air manifold portion 190 (See FIG. 13B). The coupling member 150 allows for the respective air passageway portions 170 of adjacent sections to swivel between the extended position and retracted position while allowing for the communication of pressurized air along the air passageway portions 170 in the operating positon. The coupling member 150 also allows for the respective discharge channel portions 180 of adjacent sections to swivel between the operating position and storage positions while allowing for the communication of pressurized fluid along the discharge channel portions 180 through the flexible hose assembly 158. The coupling member 150 also allows for respective air manifold portions 190 of adjacent sections to swivel between the extended operating position and retracted positions while allowing respective air manifold portions to toggle the air passageway portions 170 to allow pressurized air to be dispensed therefrom in the extended position.

The air manifold portions 190 are illustrated to be separated in FIG. 9B wherein the separate ends are separated when in the retracted position and engaged in the extended position. The separate ends of adjacent air manifold portions 190 may be made of a flexible material that allows the elongated manifold to be toggled to allow first and second air curtains to form from a plurality of air nozzles along both the front side and the rear side as will be described more fully below.

Figure 10:
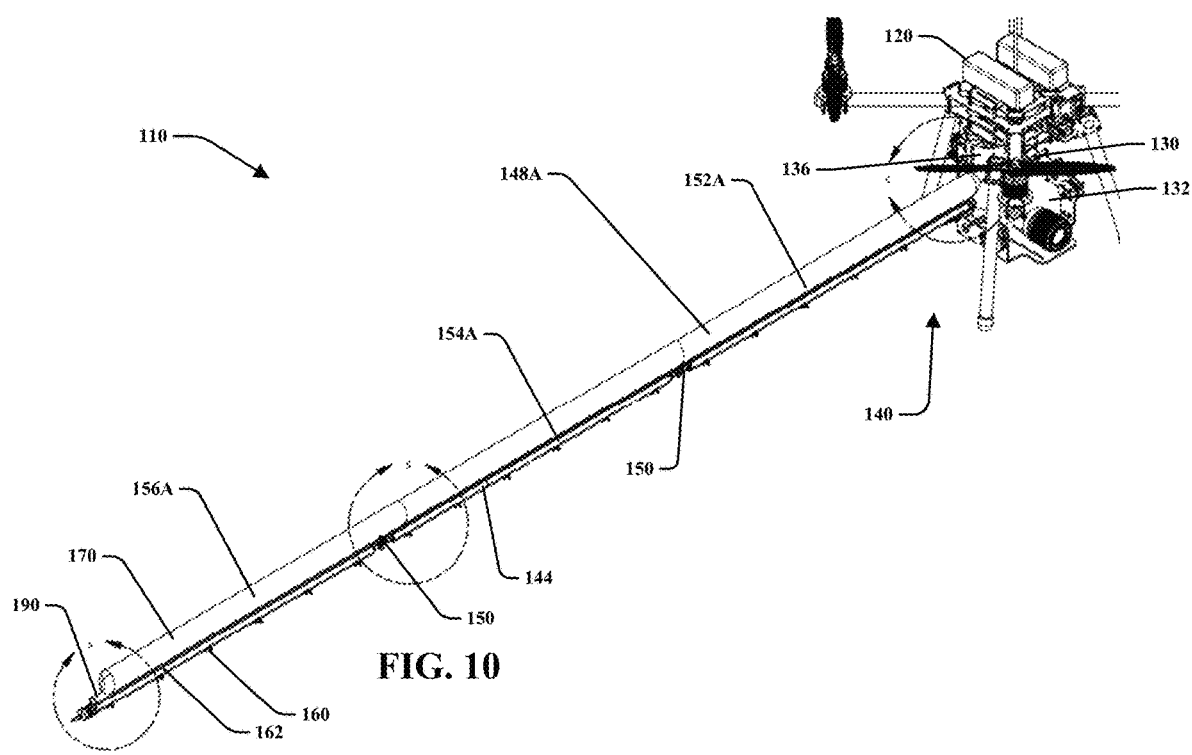
FIG. 10 is a perspective view of an embodiment of the air assist spray assembly of the instant disclosure.
Figure 11A:
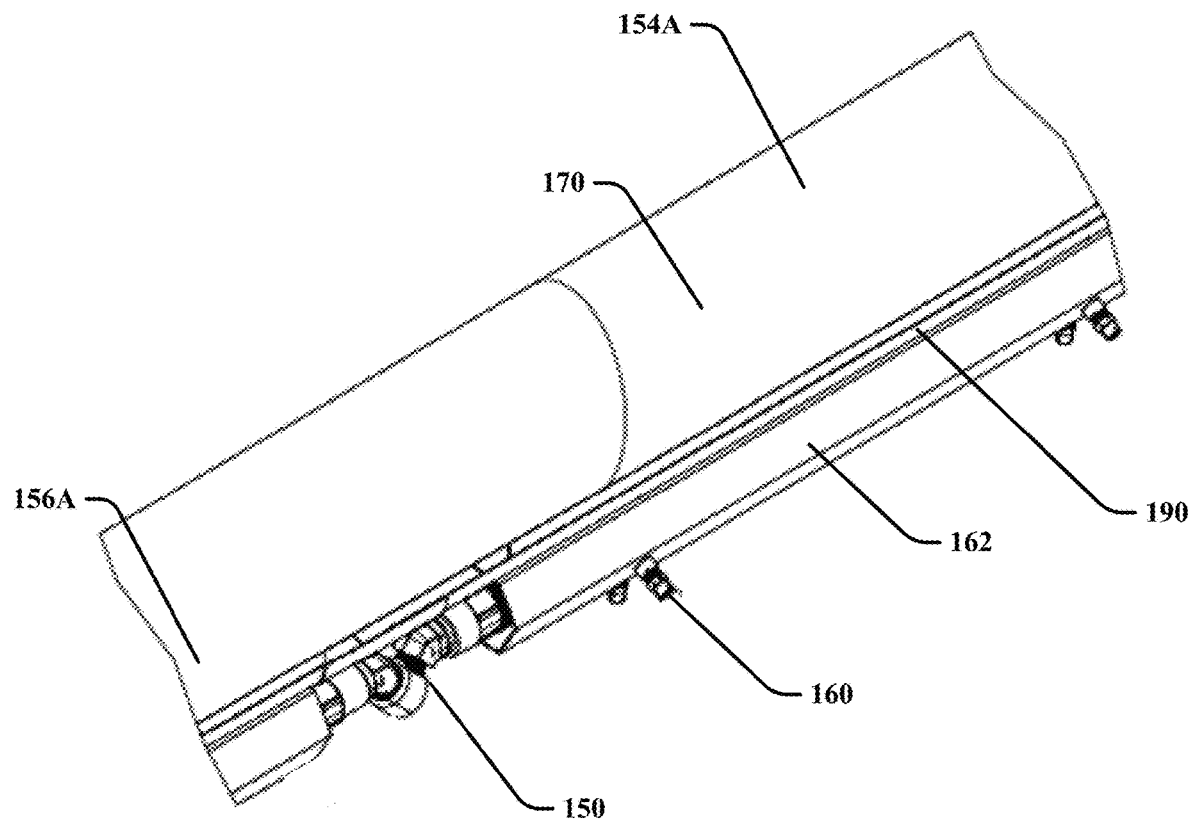
FIG. 11A is an enlarged view of a portion of the air assist spray assembly of FIG. 10.
Figure 11B:
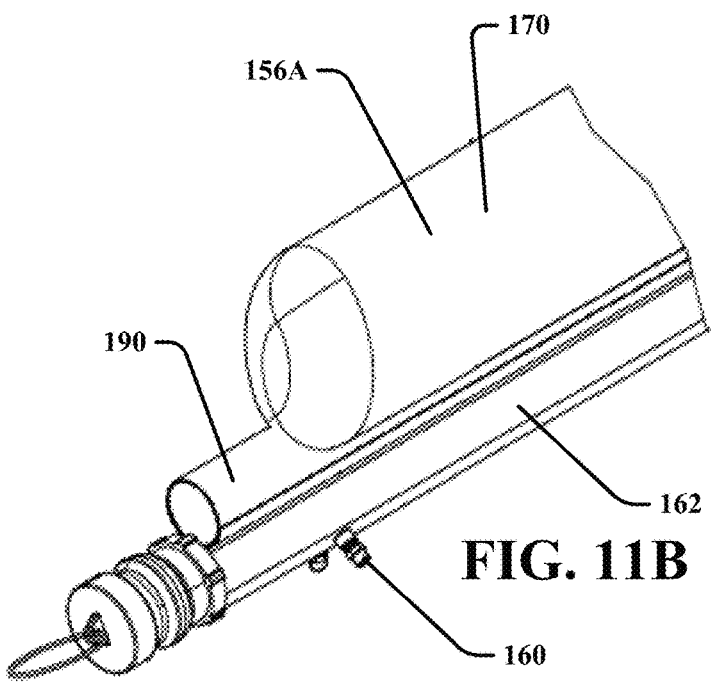
FIG. 11B is an enlarged view of a portion of the air assist spray assembly of FIG. 10.
Figure 11C:
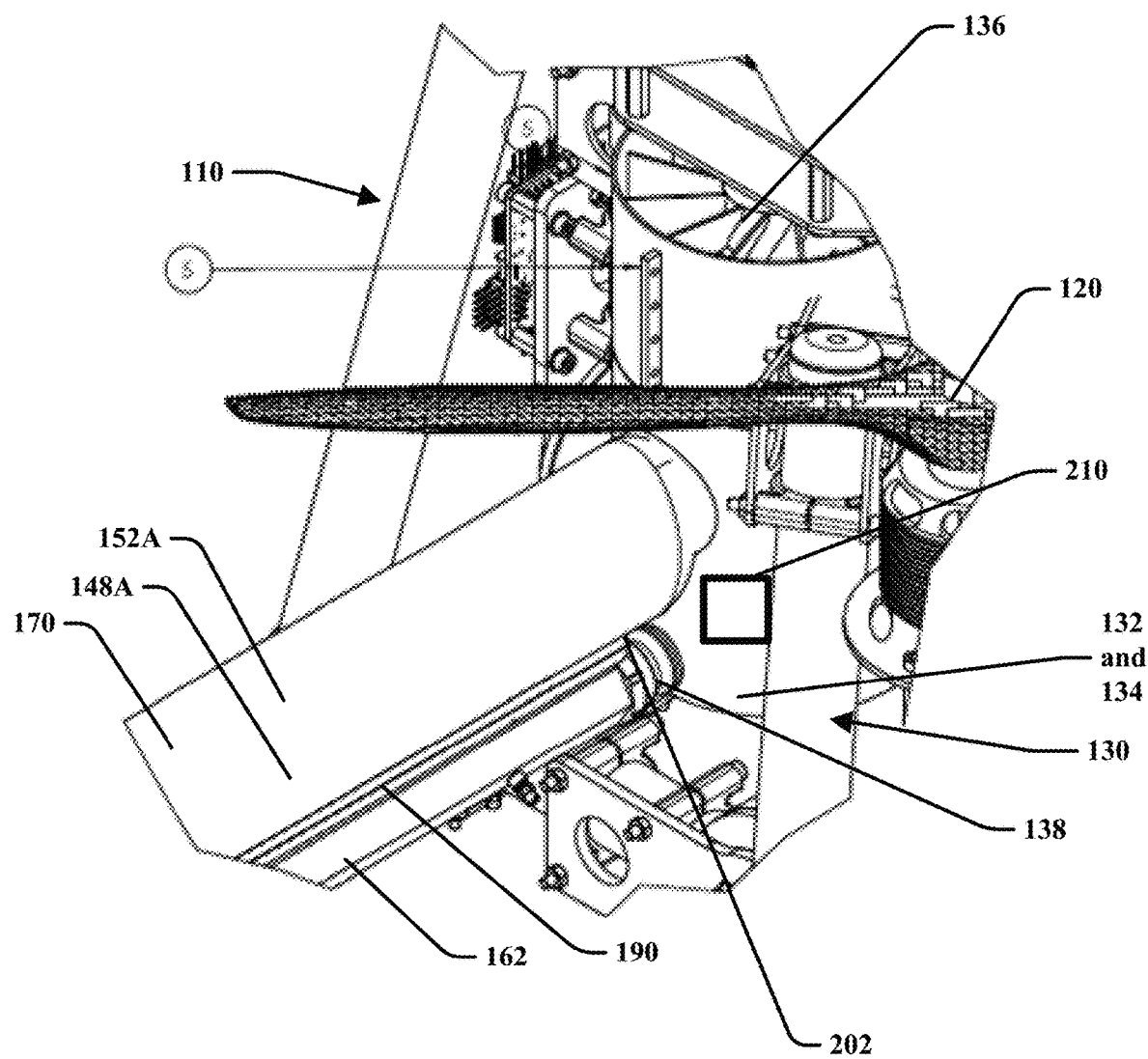
FIG. 11C is an enlarged view of a portion of the air assist spray assembly of FIG. 10.
Figure 11C:
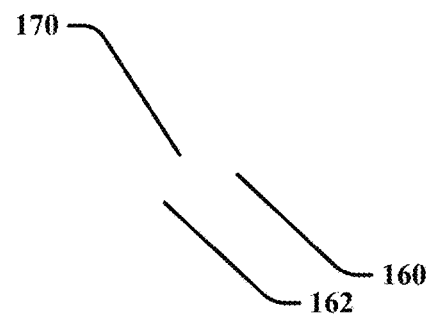
Figure 12:
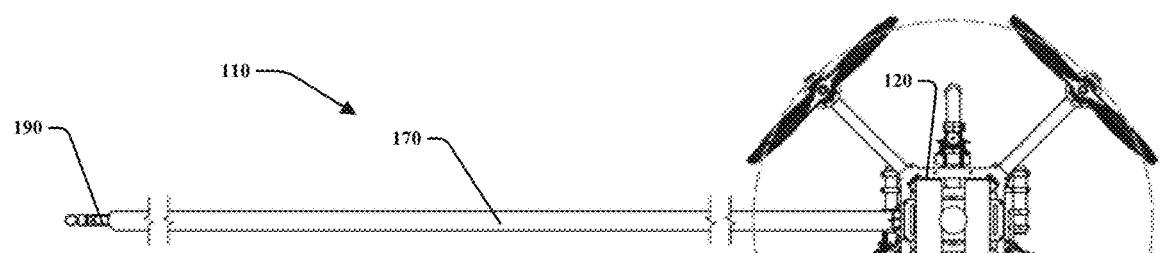
FIG. 12 is a top view of an embodiment of the air assist spray assembly of the instant disclosure in an extended position.
Figure 13A:
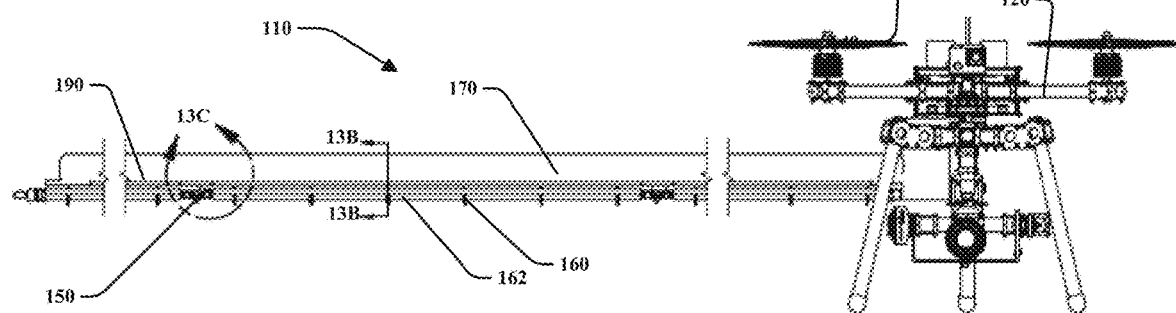
FIG. 13A is a side view of an embodiment of the air assist spray assembly of the instant disclosure in an extended position.

FIG. 10 is a perspective view of the first elongated member 144 of the air assist spray assembly when positioned in the extended operating position. FIGS. 11A, 11B, and 11C, illustrate close up portions of the first elongated member 144 of FIG. 10. FIG. 12 is a fractioned top view of FIG. 10 and FIG. 13A is a side view. Here each section 148A may be aligned along a common axis relative to one another and extends from the base frame 130 of the assembly. The base frame 130 may be attached to the aerial vehicle by a hitch assembly (not shown). Notably, the first elongated member 144 is illustrated to include the plurality of sections 148A wherein the description of the sections of the first elongated member 144 may also describe the plurality of sections 148B of the second elongated member 146.

The elongated members include a plurality of spray nozzles 160 positioned along an elongated discharge channel 162. The elongated discharge channel may comprise a plurality of sections or portions 180 attached to one another and in fluid communication relative to one another by way of the coupling members 150 and the flexible hose assemblies 158. Each section or portion 180 of the elongated discharge channel 162 may include the plurality of spray nozzles 160 configured to dispense spray droplets therefrom. The discharge channel 162 is intended for the discharge of a desired fluid as it may be received from the storage container 132. In one embodiment, the spray nozzles are rotary atomizer type nozzles. In another embodiment, the spray nozzles 160 may be electrostatic type nozzles. The plurality of spray nozzles 160 may be any type or commination of spray nozzles configured to spray a liquid product from an aerial vehicle. The spray nozzles 160 may be configured to dispense both a fine spray droplet size and a course spray droplet size or be toggled to dispense one or the other. The spray nozzles 160 may receive a power from a local power supply positioned on the aerial vehicle 120 or base frame 130. The plurality of nozzles may also be in communication with a control system 210 of the air assist spray assembly 110. The control system may be configured to turn the sprays on or off or to toggle between fine and coarse sprays, operate the rotary atomizer, or toggle power to the electrostatic nozzles. The control system 210 can also be configured to toggle various sections of spray nozzles between fine and coarse sprays or to toggle the electrostatic, or rotary function of such rotary atomizer nozzles as well as electrostatic nozzles of various sections 148 along the members 144, 146.

FIGS. 11A, 11B, and 11C illustrate enlarged perspective views along portions of the elongated member 144 including the coupling member 150, an end portion of the first elongated member 144, and its attachment to the base frame 130, storage container 132, and pressurization device 136. Notably, air manifold assembly 190 may be attached to a portion of the base frame 130 at an actuator member 202. The actuator member 202 may be able to rotate a portion of the air manifold assembly 190 to toggle the air pressure distributed from a plurality of air nozzles or apertures aligned along the air passageways as will be discussed more below.

FIG. 13A is a side view of the air assist assembly 110 attached to the aerial vehicle 120 and configured in the operating position. Cross sectional views of section 148A are shown along line 13B-13B and an enlarged view of the coupling member 150 is illustrated by call out 13C. FIG. 13B illustrates a cross sectional view of the elongated air curtain system 200 and associated air passageway 170 of the air assist assembly 110. The air curtain system 200 that includes the elongated air passageway positioned along at least one of the first elongated member and the second elongated member, the air curtain system is configured to distribute pressurized air from the elongated air passageway 170. The air curtain system is configured to assist with directing the spray droplets from the plurality of spray nozzles towards a desired area while said rotorcraft type unmanned aerial vehicle is in flight. This particularly assists with reducing off target drift and may further be bolstered when using at least one electrostatic spray nozzle 160.

The air passageway 170 may be made of a flexible material and attached to the air manifold assembly 190. The air manifold assembly 190 may include an air channel 192 and a baffle shroud 194. The air channel 192 may be positioned in the baffle shroud 194 to allow for the air channel 192 to slightly rotate relative to the baffle shroud 194 to route pressurized air through the air nozzles 198 along the baffle shroud to form a first air curtain 220A and/or a second air curtain 220B along both the front and/or the rear sides of the spray nozzles 160. The air passageway may be attached to the air channel 192 to route pressurized air therethrough. In one embodiment, the air passageway 170 may be bonded to the air channel.

Figure 13B:
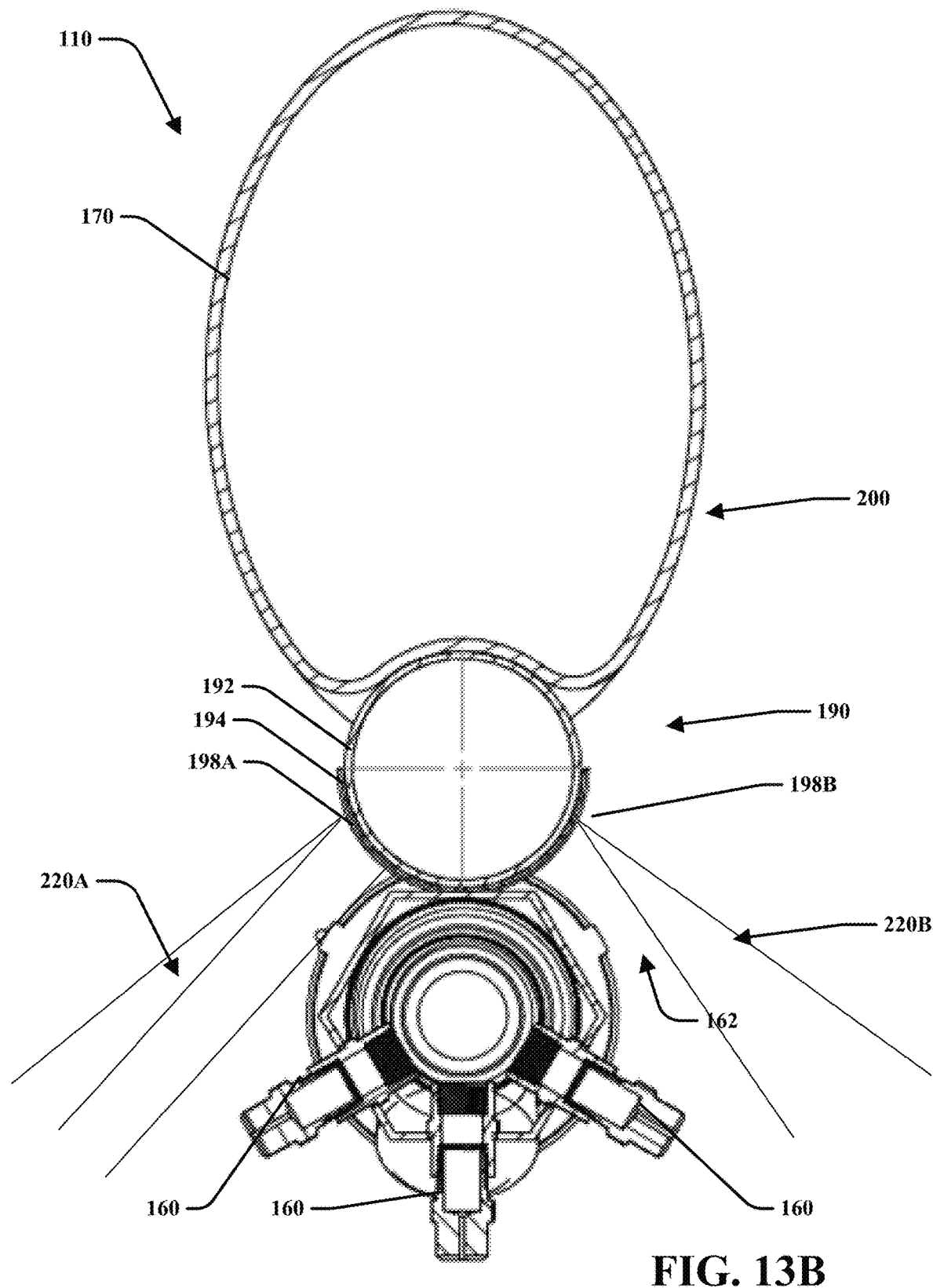
FIG. 13B is a cross sectional view of a portion of the air assist spray assembly of FIG. 13A.
Figure 16:
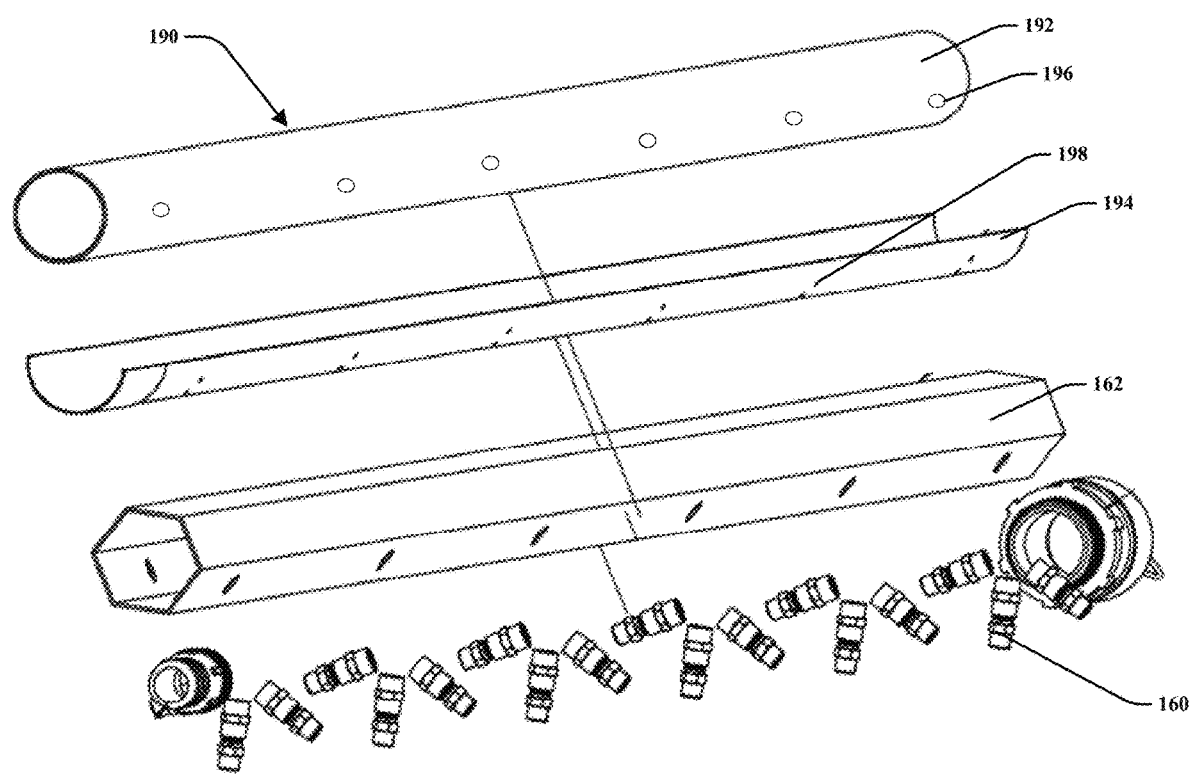
FIG. 16 is an exploded perspective view of portions of the air assist spray assembly of the instant application.

In one embodiment, the air channel 192 may be an elongated channel along sections of the members 144, 146 that extends between coupling members 150 and allows pressurized air from the air passage to be expressed from a plurality of slots or holes 196 (See FIG. 16). The baffle shroud 194 may include a plurality of slots or holes considered air nozzles 198 that may be radially aligned along the baffle shroud 194. The air nozzles 198 may include louvers placed along the exterior of the baffle shroud 194 wherein the louvers may be manually or automatically adjusted to direct expressed air therefrom to allow for the adjustment of the direction of the formed air curtain. In an embodiment, the air nozzles 198 may be aligned with the plurality of slots 196 of the air channel 192 and may be rotated to be in or out of alignement. In this embodiment, pressurized air may be routed through the air passageway 170 and through the air channel 192 and the plurality of holes 196 to be expressed through the air nozzles 198 along the baffle shroud 194. Here, the first or second air curtains may be formed. The air channel 192 may be controlled to be rotated to align the holes 196 with the air nozzles 198 of the baffle shroud 194. In an embodiment, the plurality of first air outlets 198A may form the first air curtain 220A and the plurality of second air outlets 198B may form the second air curtain 220B. The first air curtain 220A may be directed a first direction from the boom structure 140 and the plurality of second air outlets 198B are configured to dispense air to form the second air curtain 220B along a second direction of the boom structure 140, wherein the first air outlets 198A are positioned along a first side of a plurality of spray nozzles 160 and the second air outlets 198B are positioned along a second side of the plurality of spray nozzles 160, wherein the first side is generally opposite from the second side as illustrated by FIG. 13B.

In an embodiment, the air manifold assembly 190 is configured to toggle the air curtain system to at least one of (i) dispense air to only form the first air curtain 220A, (ii) dispense air to only form the second air curtain 220B, (iii) dispense air to form both the first air curtain and the second air curtain, (iv) not dispense air from any of the air nozzles 198. This may be accomplished by rotating the baffle shroud 194 relative to the air channel 192 to align the holes in predetermined relationships to rout pressurized air therefrom. The rotatable configuration between the baffle shroud 194 and air channel 192 may be supported by elastic members to prevent the air channel 192 from disengagement with the baffle shroud 194. Their may exist a small space between the air channel and baffle shroud to allow for rotation thereto.

The elongated air passageway 70 may be made of any material including hose, tube, nylon, polymers and may be generally rigid or generally flexible. IN one embodiment, the air passageway 170 is made from a sealed material such as canvas, silk, Dacron, Kevlar, or Nylon or otherwise materials used in parachute fabrics.

Figure 13C:
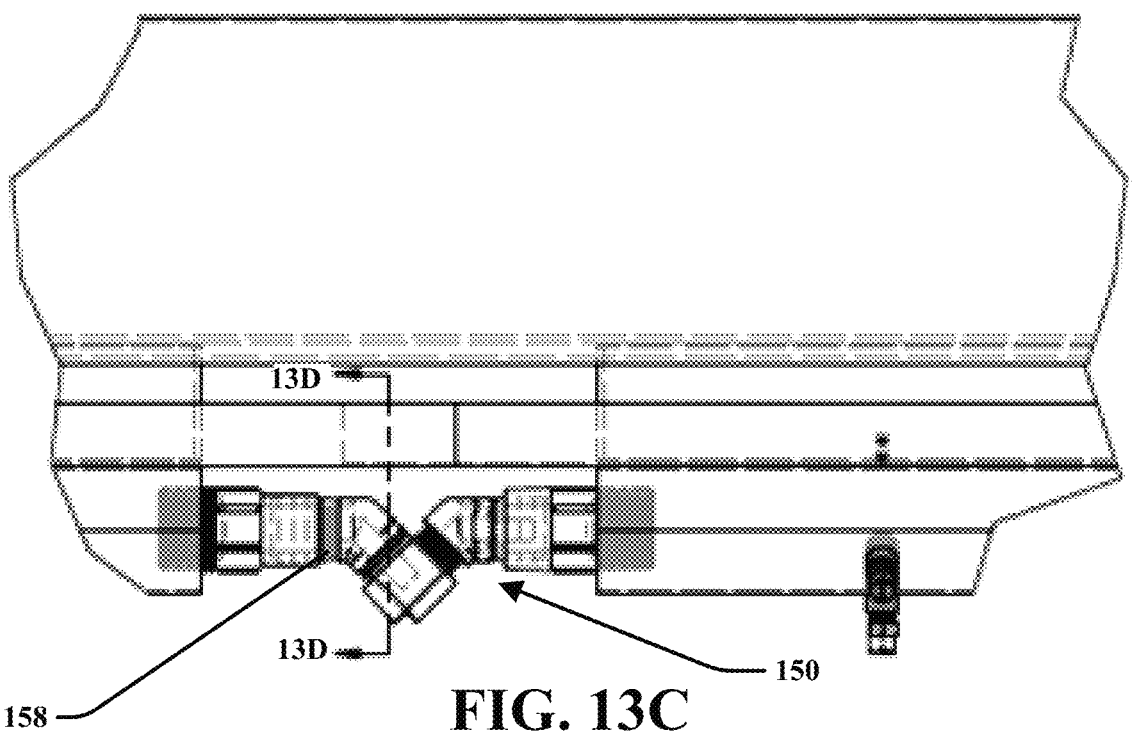
FIG. 13C is an enlarged view of a coupling member of the air assist spray assembly in the extended positon of FIG. 13A.
Figure 13D:
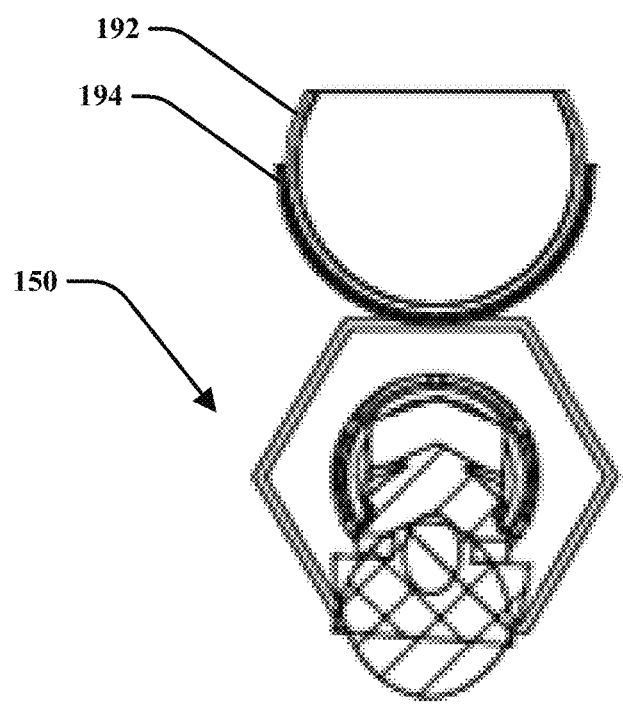
FIG. 13D is a cross sectional view of the coupling member of FIG. 13C.
Figure 13E:
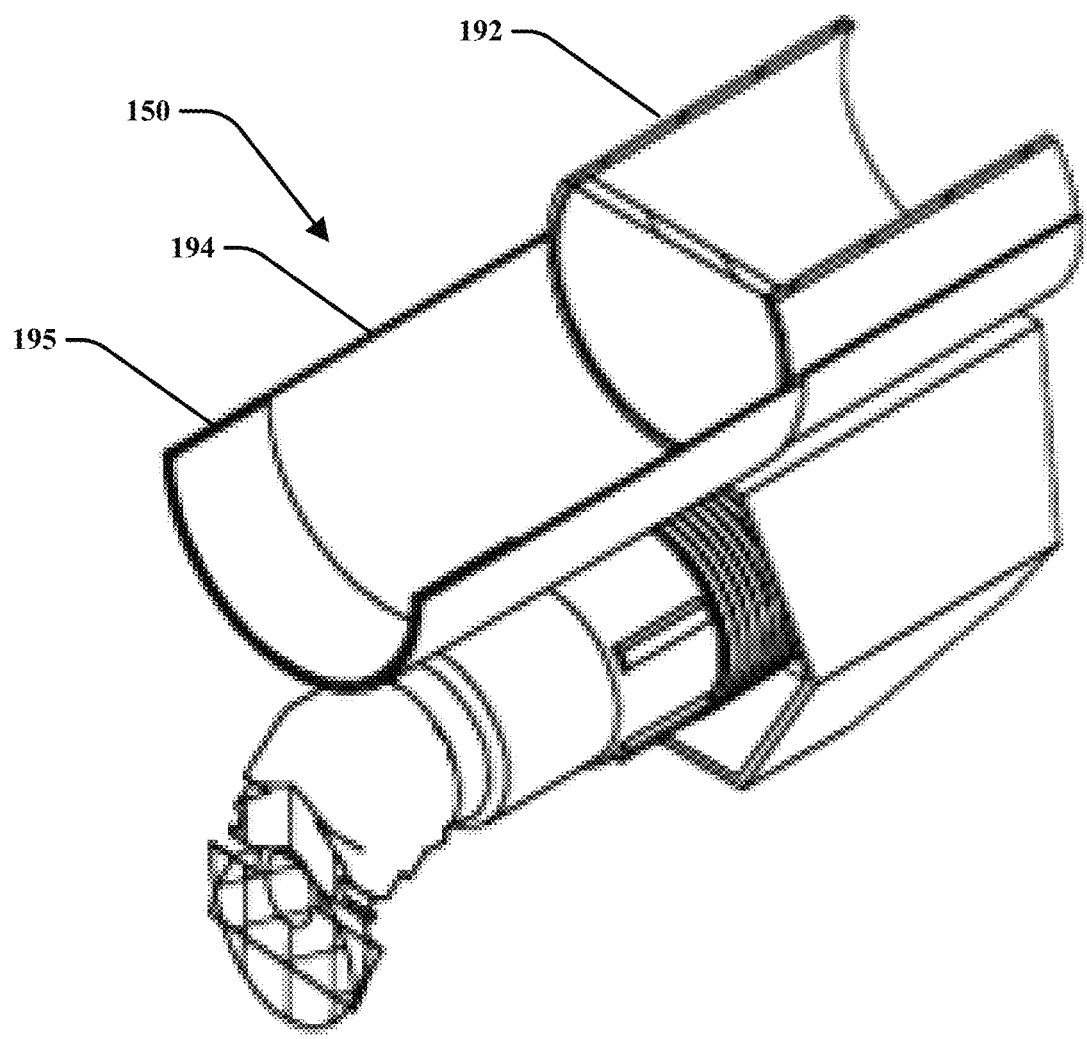
FIG. 13E is a perspective cross sectional view of the coupling member of FIG. 13C.
Figure 14A:
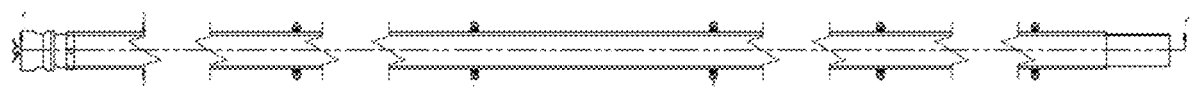
FIG. 14A is a top view of an embodiment of the air assist spray assembly of the instant application.
Figure 14B:
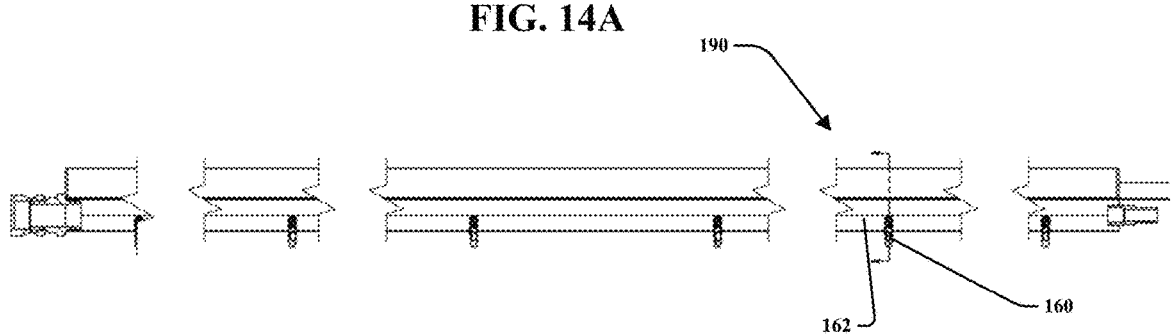
FIG. 14B is a side view of an embodiment of the air assist spray assembly of the instant application.
Figure 14C:
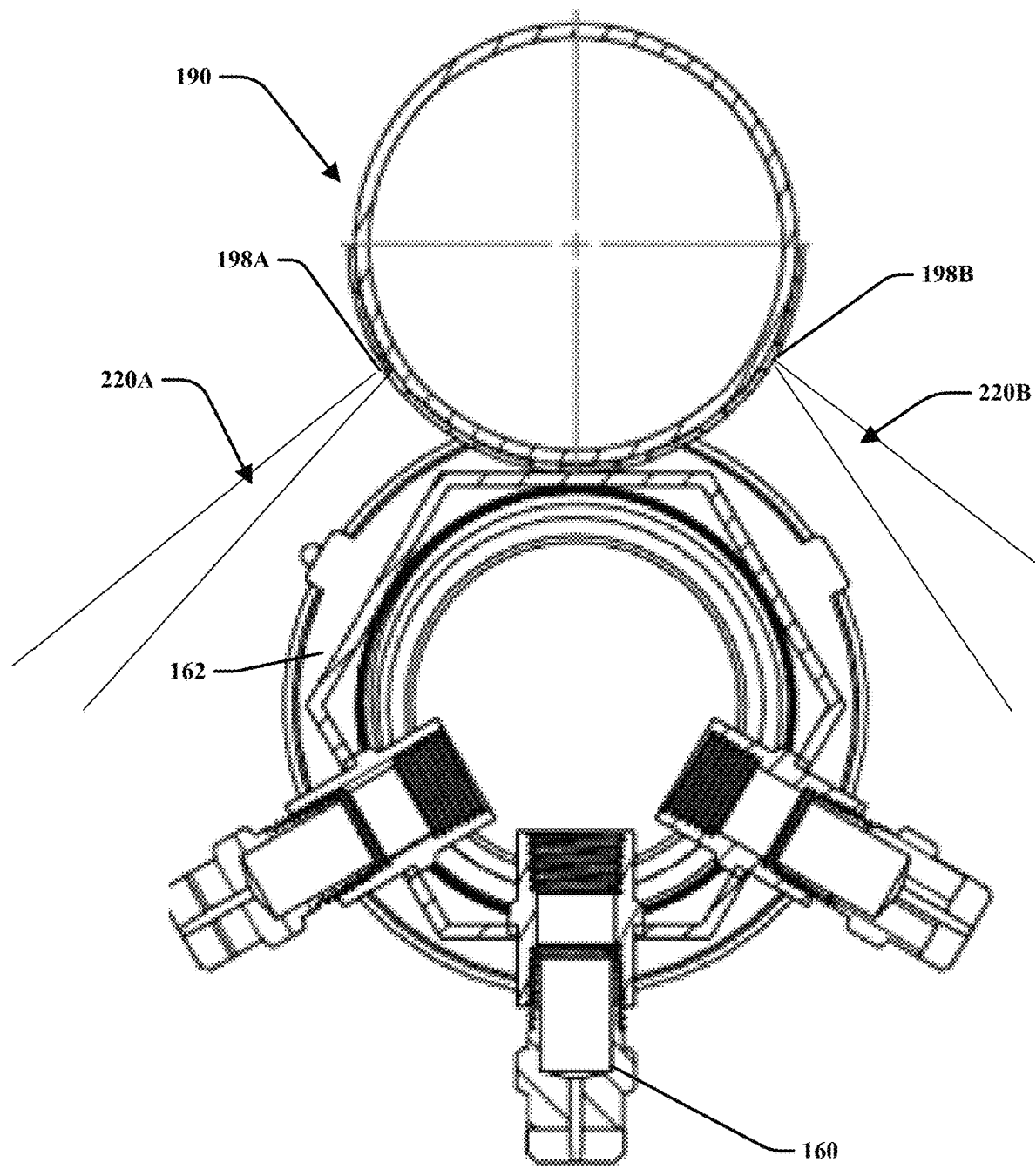
FIG. 14C is a cross sectional view of an embodiment of the air assist spray assembly of FIG. 14B.
Figure 15:
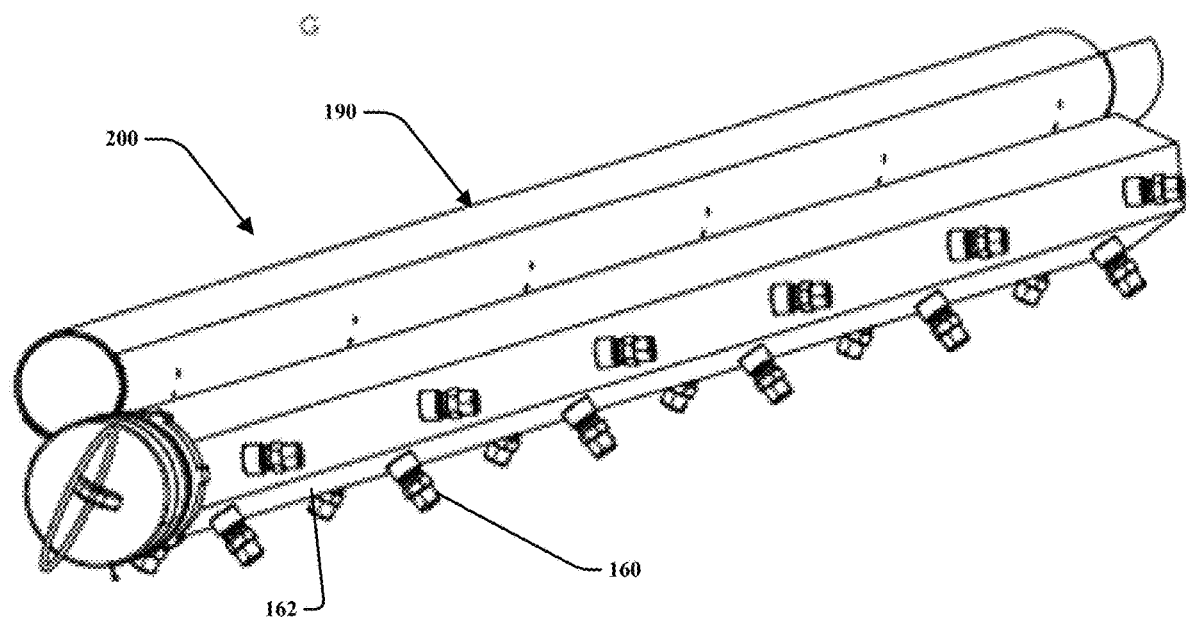
FIG. 15 is a perspective view of portions of the air assist spray assembly of the instant application.

FIG. 13C and FIG. 13D illustrate an enlarged view of the coupling member 150 and a cross sectional view of the coupling member 150, respectively. It illustrates that end portions 195 of the baffle shroud 194 (FIG. 13E) may be overlapped and otherwise engaged one another by respective end portions 195. The end portions 195 of the baffle shrouds 194 may be formed with a flexible material to allow for respective sections to be biased between the extended position and the retracted positions while allowing the end portions to be able to translate rotatable force between respective sections 148 along the elongated members 144, 146. The end portions 195 of the baffle shrouds 194 may be generally complementary shaped to one another and otherwise overlap and be relatively flexible to allow for the baffle shroud 194 to be rotated relative to the air channel 192 from a rotatable force provided by the actuator member 202 at the base frame 130.

The elongated discharge channel 162 may be in fluid communication with the container 132 to allow liquid product to be provided to the plurality of spray nozzles 160 aligned along the discharge channel 162. The discharge channel 162 may be a generally elongated conduit having a perimeter. The perimeter shape of the discharge channel may be generally hexagonal, cylindrical, or may have an airfoil shape. The hexagonal shape allows for a plurality of spray nozzles to be positioned along each flat side and dispersed separately as illustrated by FIG. 13C. This configuration allows for three (3) spray nozzles 160 to be radially aligned to one another along the length of the discharge channel 162 and may be adjusted to provide desired spray volume and coverage. The plurality of spray nozzles 160 may be configured to distribute fluid product directly from the discharge channel 162. In an embodiment, the spray nozzles 160 may be pivotally attached to the discharge channel 162 to allow for adjustment of the angle of the nozzle. In an embodiment, the spray nozzles 160 may capped when not in use or be configured to process fluid therethrough in a way that would produce a spray of fluid droplets to be applied to vegetation below. The spray of fluid droplets may include various size droplets including fine droplets and coarse droplets to allow for the fluid product to apply and penetrate a vegetation canopy. The spray nozzles 160 may be configured to be adjusted to spray only fine droplets or only coarse droplets or a mixture of both types of fine and coarse droplets as desired. Notably, the heavier or larger the droplet size of the fluid spray the more inertia and penetration of fluid product would occur through the vegetation canopy.

FIGS. 14A, 14B, 14C, and 15 illustrate various images of an embodiment the instant application that does not include the air passageway 170. In this embodiment, air may be routed through the air manifold 190 to form the first and second air curtains.

In another embodiment, at least one of the plurality of spray nozzles 160 may be an electrostatic spray nozzle.

Here, the spray nozzle may include a conductor configured to produce a voltage charge to the flow of fluid through the nozzle head. The conductor may be configured to apply a positive or a negative charge to the fluid prior to it being emitted from the nozzle. Spray droplets emitted through the electrostatic spray nozzle may be charged and when such charged droplets approach the vegetation, an opposite charge on the vegetation activates electrostatic forces and attracts the charged droplets to all sides of the vegetation.

The air curtain system 200 assists with diverting the dispensed fluid from the plurality of spray nozzles 160. The air curtain system 200 may assist with directing sprayed fluid that may include fine or coarse charged droplets towards intended vegetation. The combination of an air curtain system along with an electrostatic charge to both fine and coarse sized droplets may cause improved canopy penetration and improve the efficiency of aerial application of fluid chemicals over an increased portion of the vegetation to increase application yield. This assembly and system to increase canopy penetration as well as reduce waist will reduce waste and volume of chemicals needed in the agriculture market.

The air assist spray assembly 110 may include a control system 210 configured to operate the fluid pressurization device 134, the air pressurization device 136, the discharge valve 138, the actuator member 202, and plurality of spray nozzles 160. The control system 210 may include a plurality of various sensors that are in communication with the rotorcraft 120 or a remote control device or remote interface. The control system may be configured to detect a level of fluid remaining in the container 132 as well as sense and toggle the level of pressure in both the air and fluid systems. It may be able to communicate with each of the spray nozzles 160 to toggle the rotary or electrostatic functions and be able to communicate with other systems associated with the rotorcraft 120 to allow a user, remotely located, to operate the air assist assembly 110 and the rotorcraft 120 to distribute sprayed product therefrom. The control system 210 may also be programmed to perform specific adjustments to each of its components based on a desired or programmed flight path of the rotorcraft 120 to allow for automatic adjustments of the combined assembly and system. The air assist spray assembly 110 is beneficial for any type of fluid aerial spraying applications that require precise spray control that allow for reduced drift of sprayed while also allowing electrostatic charged sprays for chemical applications. These applications may be particularly useful for spray applications in farms, orchards, vineyards, bug and mosquito control, cleaning applications, or even fire prevention. The described assembly and system is configured to minimize drift, maximize efficiency of use, improve canopy penetration, increase the window of opportunity for spray application due to wind or climate, and increase vegetation coverage of desired fluid.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. An air assist spray assembly for a rotorcraft type unmanned aerial vehicle comprising:
    a boom structure including a base frame configured to be attached to a rotorcraft type unmanned aerial vehicle, the boom structure includes a first elongated member extending outwardly from the base frame and a second elongated member extending outwardly from the base frame;
    a plurality of spray nozzles positioned along the first elongated member and the second elongated member, the plurality of spray nozzles configured to dispense spray droplets therefrom; and
    an air curtain system that includes an elongated air passageway positioned along at least one of the first elongated member and the second elongated member, the air curtain system configured to distribute pressurized air from the elongated air passageway;
    wherein the air curtain system is configured to assist with directing the spray droplets from the plurality of spray nozzles towards a desired area while said rotorcraft type unmanned aerial vehicle is in flight;
    a pressurized air generating component in communication with the elongated air passageway of the air curtain system, the pressurized air generating component positioned on the base frame of the boom structure; and
    a storage container in fluid communication with the plurality of spray nozzles positioned along the first elongated member and the second elongated member, the storage container positioned on the base frame of the boom structure.

2. The air assist spray assembly of claim 1 wherein at least one of the spray nozzles is a rotary atomizer type spray nozzles.

3. The air assist spray assembly of claim 1 wherein at least one of the spray nozzles is an electrostatic type spray nozzle.

4. The air assist spray assembly of claim 1 wherein the spray nozzles are configured to dispense both a fine spray droplet size and a course spray droplet size.

5. The air assist spray assembly of claim 1 wherein the air curtain system includes a plurality of air nozzles aligned along a length of the air curtain system.

6. The air assist spray assembly of claim 1, wherein the boom structure is configured to be arranged in an extended operation position when configured to dispense fluid and a retracted storage position.

7. The air assist spray assembly of claim 6, wherein the first elongated member includes a plurality of sections each section includes a coupling member therebetween wherein the coupling member is configured to allow for both fluid communication and pressurized air communication between adjacent sections and allow the first elongated member to be rotated between the extended operation position and the retracted storage position.

8. The air assist spray assembly of claim 6, wherein the second elongated member includes a plurality of sections each section includes a coupling member therebetween wherein the coupling member is configured to allow for both fluid communication and pressurized air communication between adjacent sections and allow for the second elongated member to be rotated between the extended operation position and the retracted storage position.

9. An air assist spray assembly for a rotorcraft type unmanned aerial vehicle comprising:
    a boom structure including a base frame configured to be attached to a rotorcraft type unmanned aerial vehicle, the boom structure includes a first elongated member extending outwardly from the base frame and a second elongated member extending outwardly from the base frame;

a plurality of spray nozzles positioned along the first elongated member and the second elongated member, the plurality of spray nozzles configured to dispense spray droplets therefrom; and an air curtain system that includes an elongated air passageway positioned along at least one of the first elongated member and the second elongated member, the air curtain system configured to distribute pressurized air from the elongated air passageway;

wherein the air curtain system is configured to assist with directing the spray droplets from the plurality of spray nozzles towards a desired area while said rotorcraft type unmanned aerial vehicle is in flight, wherein an elongated fluid passage includes an air manifold assembly with a plurality of first air nozzles and a plurality of second air nozzles, wherein the plurality of first air nozzles are configured to dispense air to form a first air curtain along a first direction of the boom structure and the plurality of second air nozzles are configured to dispense air to form a second air curtain along a second direction of the boom structure, wherein the first air nozzles are positioned along a first side of a plurality of spray nozzles and the second air nozzles are positioned along a second side of the plurality of spray nozzles, wherein the first side is generally opposite from the second side.

10. The air assist spray assembly of claim 9, wherein the air manifold assembly is configured to toggle the air curtain system to at least one of (i) dispense air to only form the first air curtain, (ii) dispense air to only form the second air curtain, (iii) dispense air to form both the first air curtain and the second air curtain, (iv) not dispense air from either the first air curtain or the second air curtain.

11. The air assist spray assembly of claim 9, wherein the elongated fluid passage and the air manifold assembly are positioned along both the first elongated member and the second elongated member.

12. An air assist spray assembly for a rotorcraft type unmanned aerial vehicle comprising:

a boom structure including a base frame configured to be attached to a rotorcraft type unmanned aerial vehicle, the boom structure includes a first elongated member extending outwardly from the base frame and a second elongated member extending outwardly from the base frame;

a plurality of spray nozzles positioned along the first elongated member and the second elongated member, the plurality of spray nozzles configured to dispense spray droplets therefrom; and an air curtain system configured to distribute pressurized air, wherein the air curtain system is configured to assist with directing the spray droplets from the plurality of spray nozzles towards a desired area while said rotorcraft type unmanned aerial vehicle is in flight;

wherein at least one of the plurality of nozzles is an electrostatic spray nozzle a pressurized air generating component in communication with an elongated air passageway of the air curtain system, the pressurized air generating component positioned on the base frame of the boom structure; and a storage container in fluid communication with the plurality of spray nozzles positioned along the first elongated member and the second elongated member, the storage container positioned on the base frame of the boom structure.

13. The air assist spray assembly of claim 12, wherein said air curtain system includes an elongated air passageway positioned along at least one of the first elongated member and the second elongated member, the air curtain system configured to distribute pressurized air from the elongated air passageway.

14. The air assist spray assembly of claim 13 wherein the air curtain system includes a plurality of air nozzles aligned along a length of the air curtain system.

15. The air assist spray assembly of claim 12 wherein at least one of the spray nozzles is a rotary atomizer type spray nozzle.

16. The air assist spray assembly of claim 12 wherein the spray nozzles are configured to dispense both a fine spray droplet size and a course spray droplet size.

17. The air assist spray assembly of claim 12, wherein the boom structure is configured to be arranged in an extended operation position when configured to dispense fluid and a retracted storage position.

18. An air assist spray assembly for a rotorcraft type unmanned aerial vehicle comprising:

a boom structure including a base frame configured to be attached to a rotorcraft type unmanned aerial vehicle, the boom structure includes a first elongated member extending outwardly from the base frame and a second elongated member extending outwardly from the base frame;

a plurality of spray nozzles positioned along the first elongated member and the second elongated member, the plurality of spray nozzles configured to dispense spray droplets therefrom; and an air curtain system configured to distribute pressurized air, wherein the air curtain system is configured to assist with directing the spray droplets from the plurality of spray nozzles towards a desired area while said rotorcraft type unmanned aerial vehicle is in flight; wherein at least one of the plurality of nozzles is an electrostatic spray nozzle, wherein the air curtain system includes an air manifold assembly with a plurality of first air nozzles and a plurality of second air nozzles, wherein the plurality of first air nozzles are configured to dispense air to form a first air curtain along a first direction of the boom structure and the plurality of second air nozzles are configured to dispense air to form a second air curtain along a second direction of the boom structure, wherein the first air nozzles are positioned along a first side of a plurality of spray nozzles and the second air nozzles are positioned along a second side of the plurality of spray nozzles, wherein the first side is generally opposite from the second side.

19. The air assist spray assembly of claim 18, wherein the air manifold assembly is configured to toggle the air curtain system to at least one of (i) dispense air to only form the first air curtain, (ii) dispense air to only form the second air curtain, (iii) dispense air to form both the first air curtain and the second air curtain, (iv) not dispense air from either the first air nozzles or the second air nozzles.

* * * * *